(12) United States Patent
Kawasaki et al.

(10) Patent No.: US 6,652,166 B2
(45) Date of Patent: Nov. 25, 2003

(54) PHOTOGRAPHIC FILM CARTRIDGE

(75) Inventors: Hidetoshi Kawasaki, Kanagawa (JP); Kazunori Mizuno, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/328,143

(22) Filed: Dec. 26, 2002

(65) Prior Publication Data

US 2003/0133711 A1 Jul. 17, 2003

(30) Foreign Application Priority Data

Dec. 26, 2001 (JP) ........................................ 2001-393787
Dec. 26, 2001 (JP) ........................................ 2001-393927

(51) Int. Cl.[7] ........................ G03B 17/26; G11B 23/07; D06C 11/00
(52) U.S. Cl. ...................... 396/513; 242/348.4; 428/91; 26/29 R
(58) Field of Search ................. 396/513, 518; 242/348.4, 538.4, 588.5; 428/85, 91; 26/29 R

(56) References Cited

U.S. PATENT DOCUMENTS

| | | | | |
|---|---|---|---|---|
| 4,468,844 A | * | 9/1984 | Otto | 26/29 R |
| 5,084,948 A | * | 2/1992 | Nielsen et al. | 26/29 R |
| 5,815,896 A | * | 10/1998 | Dischler | 26/29 R |
| 5,860,613 A | * | 1/1999 | Holland | 396/513 |

FOREIGN PATENT DOCUMENTS

| | | |
|---|---|---|
| JP | 7-152114 A | 6/1995 |
| JP | 8-15825 A | 1/1996 |
| JP | 2000-29175 A | 1/2000 |

* cited by examiner

*Primary Examiner*—Christopher Mahoney
(74) *Attorney, Agent, or Firm*—Sughrue Mion, PLLC

(57) ABSTRACT

A photographic film cartridge includes a light-shielding cloth. The light-shielding cloth is subjected to napping with a coarse napping machine and then napping with a fine napping machine. The napping machines have napper rollers including a pile roller and a counter roller. The rotational speed of the pile roller of the fine napping machine is higher than that of the pile roller of the coarse napping machine, and the rotational speed of the counter roller of the coarse napping machine is higher than that of the counter roller of the fine napping machine. The napping is carried out so that the cloth thickness obtained by the fine napping machine is less than the cloth thickness obtained by the coarse napping machine. A further napping is carried out using the fine napping machine so that the cloth thickness is greater than that obtained by the coarse napping machine.

18 Claims, 5 Drawing Sheets

PHOTOGRAPHIC FILM CARTRIDGE

BACKGROUND OF THE INVENTION

1. Field of the Invention

The present invention relates to a light-sensitive material light-shielding container comprising a light-shielding cloth (also called 'teremp') that is attached, for the purpose of light shielding, to upper and lower inner wall surfaces of a slit-shaped opening through which the light-sensitive material passes, the slit-shaped opening being formed in a cartridge body of a photographic film cartridge, a magazine for housing printing paper or light-sensitive material for printing, etc.

2. Description of the Related Art

A photographic film cartridge comprises as minimum constituent features a spool, a cartridge shell, a pair of caps attached to opposite sides of the shell, and a photographic film wound around the spool, and has a configuration in which the photographic film is unexposed prior to use, the entirety or the majority thereof is wound around the spool within the cartridge shell, the photographic film is pulled out of the cartridge shell within a camera and exposed to an image, and it is again wound into the cartridge shell.

JP-A-7-152114 (JP-A denotes a Japanese unexamined patent application publication) discloses a light-shielding cloth for a photographic film cartridge in which a napped cloth is used. This publication discloses that a two-stage napping is carried out twice and, preferably, three times. In this publication, the height of the nap is adjusted by shearing, and although it is possible to control the height of the nap by shearing, there is the problem that fiber waste is easily generated.

JP-A-2000-206649 discloses the removal of fiber waste by immersion in water after napping, thus lessening the fiber waste. However, it is difficult to completely remove the fiber waste even by immersion in water after shearing. There has been therefore a desire for the height of nap to be controlled precisely without shearing.

BRIEF SUMMARY OF THE INVENTION

It is an object of the present invention to provide a photographic film cartridge comprising a napped light-shielding cloth formed from inexpensive warp and weft in which generation of fiber waste during napping can be suppressed, the thickness can easily be controlled to give a target value, and the light-shielding performance and film drawing-out performance are both excellent.

The present inventors have carried out an intensive investigation into inexpensive napped cloth in terms of the optimum rotational speeds of coarse napping and fine napping and the optimum number of times napping is carried out in order to achieve the light-shielding performance of the cartridge and the film drawing-out torque, and as a result the present invention has been accomplished.

The above-mentioned object has been attained by the following means.

That is, it is achieved by a photographic film cartridge comprising a light-shielding cloth that is attached to a photographic film cartridge outlet slit through which a film is drawn out, the light-shielding cloth being a cloth that is subjected to napping, the napping comprising napping with a coarse napping machine and then napping with a fine napping machine, the napping machines having napper rollers comprising a pile roller that rotates in the direction in which the cloth advances and a counter roller that rotates in the direction opposite to the direction in which the cloth advances, the rotational speed of the pile roller of the fine napping machine being higher than the rotational speed of the pile roller of the coarse napping machine and the rotational speed of the counter roll of the coarse napping machine being higher than the rotational speed of the counter roller of the fine napping machine, the napping being carried out so that the cloth thickness obtained by napping using the fine napping machine is less than the cloth thickness obtained by napping using the coarse napping machine, and a further napping being carried out using the fine napping machine so that the cloth thickness is greater than the cloth thickness obtained by napping using the coarse napping machine.

DETAILED DESCRIPTION OF THE INVENTION

Figure 3:
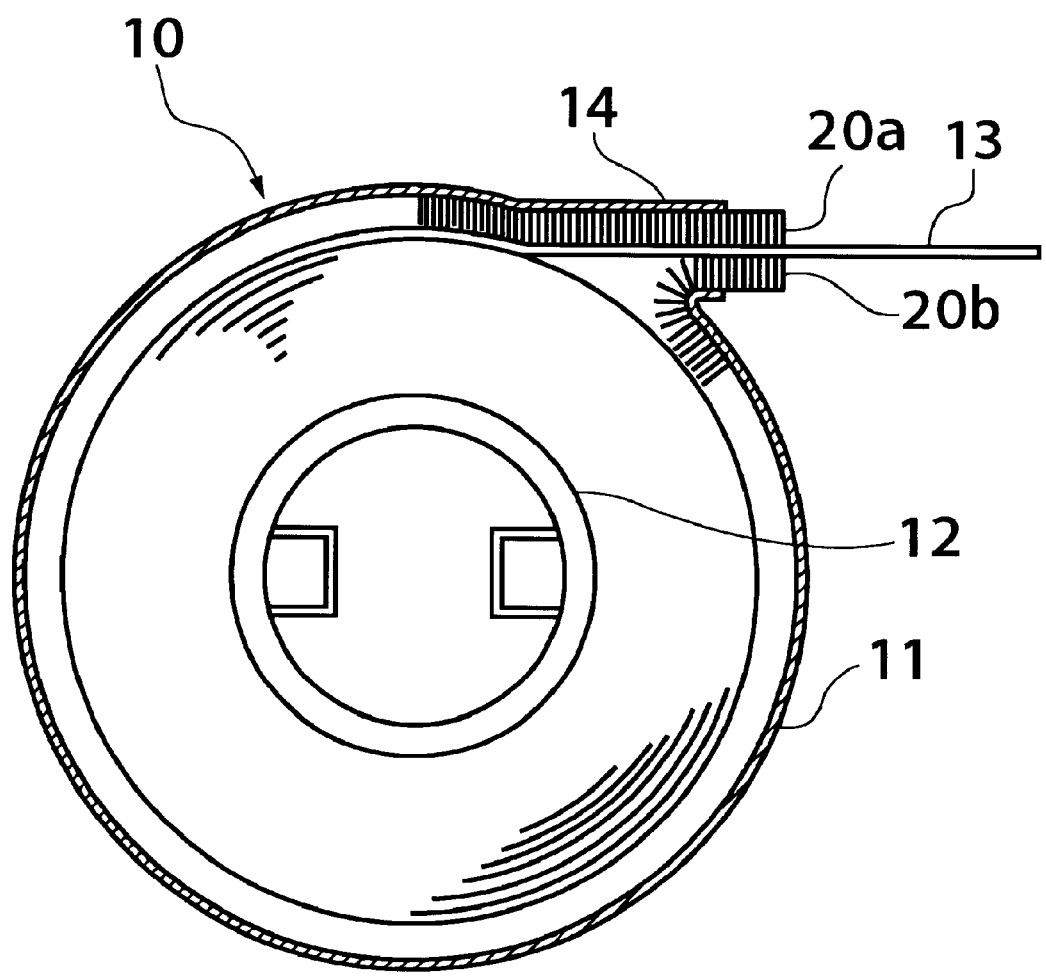
FIG. 3 is a cross-sectional view of one example of a representative photographic film cartridge.
Figure 4:
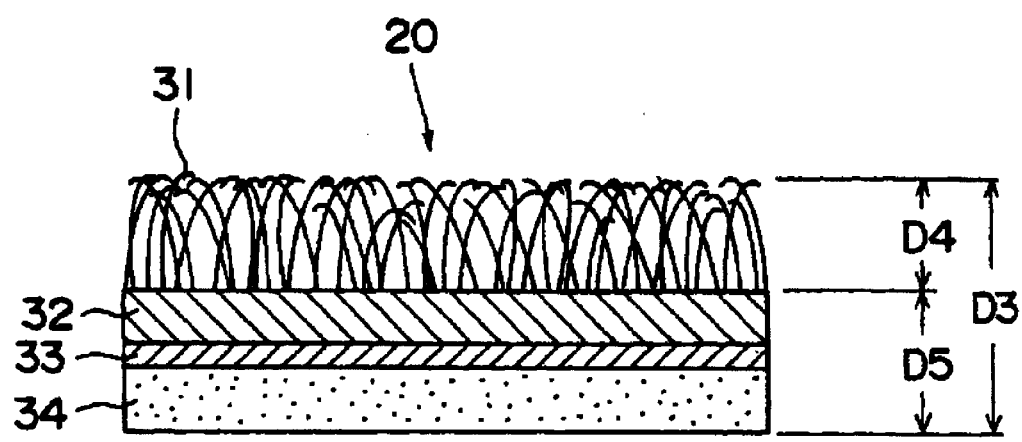
FIG. 4 is a magnified cross-sectional view of one example of a light-shielding cloth used in the present invention.

FIG. 3 shows a cross-sectional view of one example of a photographic film cartridge of the present invention, and FIG. 4 shows a cross-sectional view of one example of a light-shielding cloth (also called teremp) used in this cartridge.

A film case of the photographic film cartridge is formed by bending a tube-forming section 11 into a tube shape so that light-shielding cloths 20 attached to port-forming sections 14 are in contact with each other. A photographic film 13 wound around a spool 12 is drawn out while both surfaces thereof are in contact with the light-shielding cloths 20 of the port-forming sections 14, and the photographic film 13 within the cartridge is thereby shielded from light.

Referring to FIG. 4, the teremp 20 comprises a long length of cloth (hereinafter called cloth) 32, a nap 31 formed by subjecting the cloth 32 to a napping treatment, an adhesive 34 for attaching the teremp 20 to a slit of the photographic film cartridge, and an undercoat (hereinafter called a sealant) 33 for preventing the adhesive from penetrating into the cloth. The thickness of the teremp 20 is preferably in the range of 0.5 to 2.5 mm, and more preferably in the range of 1.2 to 2.0 mm. The thickness (denoted by D4 in FIG. 4) of the nap 31 is preferably in the range of 0.1 to 1.7 mm in terms of the resistance to drawing-out of the photographic film. Furthermore, the height of the nap 31 of the teremp used in the present invention can be adjusted easily without shearing after the napping treatment.

Figure 2:
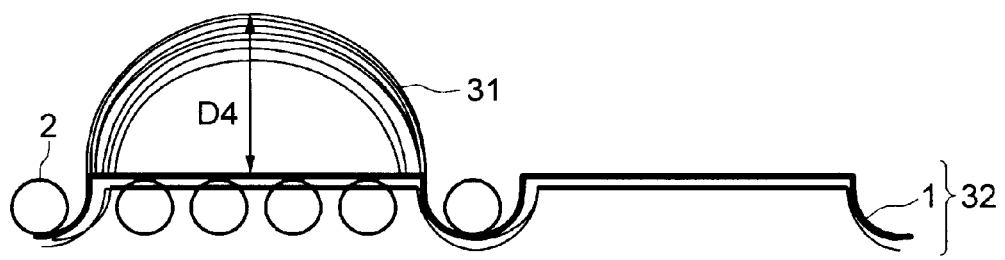
FIG. 2 is a cross-sectional view of a napped cloth according to one embodiment of the present invention.
Figure 5:
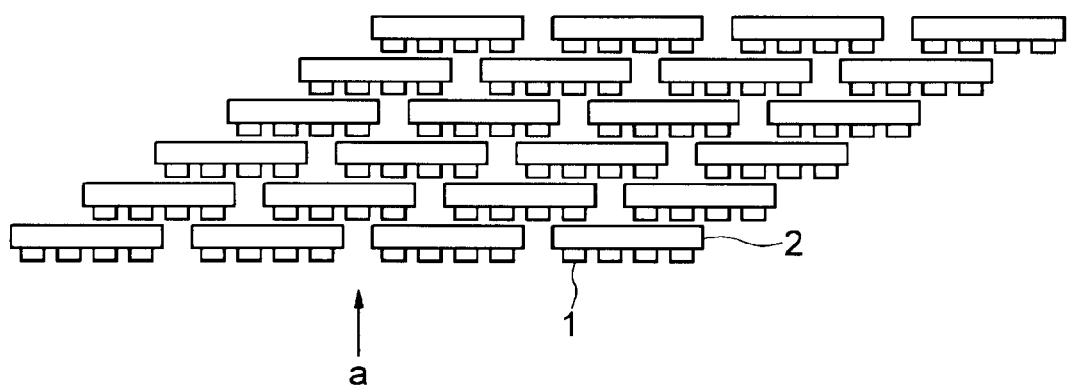
FIG. 5 is a sketch showing the weave structure (5 shaft filling face satin) of a napped cloth according to one embodiment of the present invention.

The cloth 32 can be either a knitted cloth or a woven cloth. In the case of a woven cloth, the warp is preferably a filament thread, and the weft is preferably a two-ply or three-ply, spun or filament thread, and particularly preferably a two-ply spun thread. The woven cloth is preferably a 3 to 5 shaft filling face satin or a ⅓ or ¼ twill, and particularly preferably a 4 or 5 shaft filling face satin. FIG. 2 shows a schematic cross-sectional view of one example of a napped cloth, and FIG. 5 shows a conceptual diagram of one example of the weave structure of 5 shaft filling face satin. In FIG. 5, 1 denotes a weft, 2 denotes a warp, and a denotes the direction in which light enters.

The nap 31 and the cloth 32 preferably have light-shielding properties and low electrostatic charging. In order to improve the light-shielding properties, the cloth is preferably colored, and the color and the coloring method are not particularly limited. In particular, black absorbs a wide range of wavelengths of light and is effective at enhancing the light-shielding properties. The coloring method may involve dying the cloth, or weaving or knitting a colored fiber to form the cloth. Furthermore, when drawing the photographic film out of the photographic film cartridge, the photographic film rubs against the nap of the teremp, and the teremp might become electrically charged. It is therefore preferable for the cloth to contain a conductive material or an antistatic agent or for the surface thereof to be coated with an antistatic agent. Examples of the conductive material include carbon black. Since carbon black has a black color, it is advantageous in terms of shielding against light.

The material of the sealant 33 is not particularly limited, but it is preferable to use one having compatibility with both the cloth 32 and the adhesive 34. General examples thereof include natural rubber, casein, polyvinyl alcohol and derivatives thereof, polyacrylamide, vinyl methyl ether—maleic anhydride copolymers, and phenol resins. The adhesive 34 may be either a pressure sensitive adhesive or a hot melt (heat sensitive) adhesive, and the components thereof are not particularly limited. Examples of the pressure sensitive adhesive include a rubber adhesive, an acrylic adhesive, and a vinyl methyl ether—maleic anhydride copolymer, and examples of the hot melt adhesive include an ethylene—vinyl acetate copolymer and a polyamide. It is also possible to use a sealing adhesive, which serves as a sealant and an adhesive, while omitting the sealant 33.

The teremp of the present invention can be produced, for example, as follows. One side of a long length of woven or knitted cloth is subjected to a napping treatment, which is described below. The side opposite to the napped side is coated with a sealant and dried, and then coated with an adhesive and dried. The long length of napped cloth thus obtained is cut to required dimensions.

In the case where the long length of cloth is dyed and then napped, in order to suppress shrinkage of the long length of cloth in its width direction during dying, the long length of cloth is preferably subjected to a thermal treatment (hereinafter also called pre-heat set) before dyeing. The pre-heat set is carried out by, for example, blowing hot air at 180° C. The width is preferably set during the thermal treatment (blowing hot air) so that it is stretched and made 1% to 5% wider than the width prior to the thermal treatment.

The napping treatment is carried out by a standard method, that is, by bringing the long length of cloth, which is being conveyed, into contact (rubbing) with a napper roller that has spike-like projections and rotates in the opposite direction to that in which the long length of cloth is conveyed. The napping treatment preferably involves a coarse napping treatment followed by a fine napping treatment. The coarse napping treatment referred to here means pulling out long coarse threads from the cloth (low nap density), the fine napping treatment means napping a cloth finely (high nap density), and it can be controlled by changing, for example, the speed at which the long length of cloth is conveyed, the rotational speed of the roller, the height and number of the spike-like projections, and the contact torque between the long length of cloth and the napper roller. In order to enhance the napping effect, the long length of napped cloth can be further napped in the direction opposite to that in which the napping treatment has been carried out. The number of times the napping treatment is carried out is not particularly limited, but repeating the treatment can increase the number of napped fibers, and the nap density of the napped fabric increases, thereby enhancing the napping effect.

The present invention employs a light-shielding cloth that is napped coarsely so as to have an increased cloth thickness and then napped finely so as to make the surface finer and softer. When carrying out the two-step napping treatment in this way, it is firstly carried out so that the thickness of the coarsely napped cloth decreases by finely napping it to give a fluffy surface. When measuring the thickness of a finely napped fluffy cloth, since the cloth is compressed even with a slight pressure, the measured value of the thickness decreases. Subsequently, a further fine napping treatment is carried out so that the thickness of the cloth becomes greater than its original thickness after the coarse napping treatment. Repeating the fine napping can give a more fluffy texture, and the measured value of the cloth thickness increases. Napping in this way to give fluffiness can improve the light-shielding properties of the light-shielding cloth used in the photographic film cartridge. Moreover, since the napping to give fluffiness is carried out gradually, the cloth thickness increases gradually, and the cloth thickness can be controlled with high precision, thereby eliminating the need for shearing.

Figure 1A:
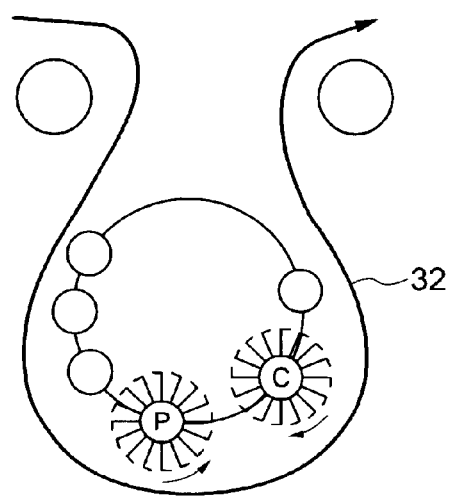
FIGS. 1A and 1B are sketches of napping machines used for the production of a light-shielding cloth according to one embodiment of the present invention.
Figure 1B:
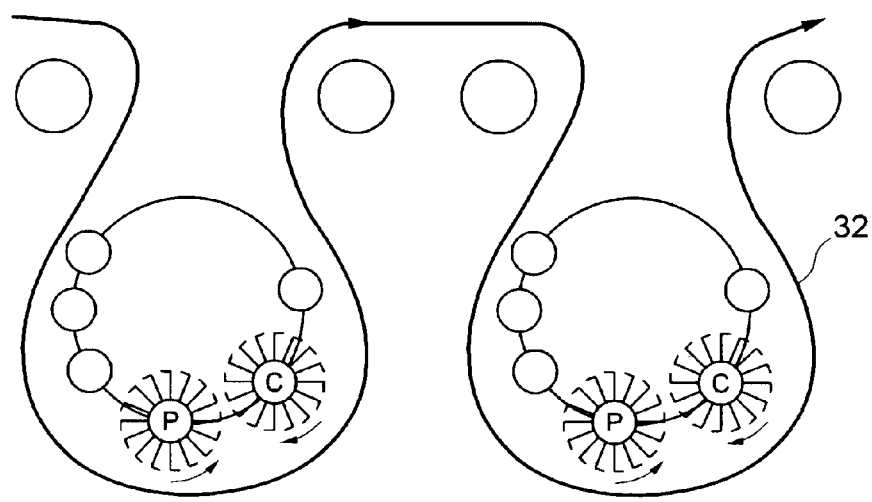

FIGS. 1A and 1B are sketches showing examples of the napping machines used in the present invention.

The napping machines used in the present invention have two types of napper rollers that rotate in opposite directions, that is, a pile roller P that rotates in the direction in which the cloth advances and a counter roller C that rotates in the direction opposite to that in which the cloth advances. When carrying out a fine napping treatment after a coarse napping treatment, the rotational speed of the pile roller P is higher in the napping machine for the fine napping treatment than in the napping machine for the coarse napping treatment, and the rotational speed of the counter roller C is higher in the napping machine for the coarse napping treatment than in the napping machine for the fine napping treatment.

In a single stage napping machine A preferably used in the coarse napping treatment, a wide gap is set between the napper rollers that rotate in opposite directions, the fabric makes tight contact with the napper rollers so as to wrap around them, and as a result the force to pull out threads from the fabric becomes strong, thereby forming a coarse loop type nap having large thickness and decreased width. This plays a very important role in the following step (fine napping treatment). It is also possible to employ a napping machine having two or more stages for the coarse napping treatment.

In a two-stage napping machine B preferably used in the fine napping treatment, by setting a narrow gap between the napper rollers that rotate in opposite directions, the coarsely napped surface of the fabric is further finely napped to give fluffiness. This adjusts the final thickness. Since the width decreased each time is smaller than that achieved by the coarse napping treatment, it is preferable to obtain a sufficient decreased width by the coarse napping treatment. It is also possible to employ a napping machine having two or more stages in the fine napping treatment.

In FIG. 1, as one embodiment, the single stage napping machine A has a total of 36 napper rollers including 18 counter rollers C and 18 pile rollers P, and the two-stage napping machine B has a total of 24 napper rollers for the front drum including 12 counter rollers C and 12 pile rollers P and a total of 24 napper rollers for the rear drum including 12 counter rollers C and 12 pile rollers P.

Preferable materials of the light-shielding cloth are now explained.

The warp is a processed thread made by a single step heater method, and preferably has a thickness of 75 to 140 denier and 36 to 48 filaments. The warp is preferably interlaced at 150 to 250 times/m (air entangling) in order to prevent the thread from becoming frayed. When the number of twists in the weft is small, threads will drop off during napping, and it is therefore preferable to use strong twisting of 250 to 350 twists/m.

In order to achieve product performance and, in particular, film drawing-out torque and light-shielding properties, it is preferable for the warp density to be 120 to 150 threads/inch and for the weft density to be 60 to 90 threads/inch. The weft is preferably a spun thread of 1.0 to 1.4 denier on a single fiber equivalent basis.

The spun length is preferably 38 to 50 mm in terms of the napping properties. When it is short, threads will drop off during napping. When it is long, the napping properties deteriorate.

Preferable examples of control/adjustment values for the torque conditions and process control values for the width, thickness, and warp density in the napping treatments are described below.

First and second napping treatments are carried out using a high napping torque single stage napping machine, and third to sixth napping treatments are carried out using a comparatively low napping torque two-stage napping machine (having two napping drums). The number of napping treatments is desirably twice for coarse napping (if it is three times or more, napped threads drop off), and it is also possible to carry out coarse napping once using the two-stage napping machine. In fine napping, since bundles of weft pulled out by the coarse napping treatment are fiberized to adjust the thickness to a target value, it is preferable to employ a low napping torque and a large number of napping treatments, and four napping treatments using the two-stage napping machine give a good result. It is also possible to nap eight times using a single stage, twice using four stages, or once using eight stages.

The light-shielding cloth of the present invention preferably comprises a cloth that is immersed in a napping oil containing an ester-based wax and a normal paraffin, then dried, and then subjected to the napping treatment using the napping machine having napper rollers. The napping oil preferably used in the present invention is explained below.

For the production of the light-shielding cloth used in the cartridge of the present invention, the ester-based wax and the normal paraffin are used in combination.

With regard to the ester-based wax, a sorbitan fatty acid ester can preferably be used. The sorbitan fatty acid ester is obtained by dehydration-condensation of sorbitol and a fatty acid at about 190° C. to give a sorbitol fatty acid ester, and further heating this sorbitol fatty acid ester at 230 to 250° C. In this case, a sorbide fatty acid ester is also present as a byproduct.

The sorbitan fatty acid ester is also commercially available as a SPAN type manufactured by Atlas (US), and products manufactured by Kao Corporation, Sanyo Chemical Industries, Ltd., etc.

Specific examples of the sorbitan fatty acid ester include sorbitan monolaurate, sorbitan monooleate, sorbitan monopalmitate, sorbitan monostearate, sorbitan sesquioleate, sorbitan trioleate, sorbitan distearate, and sorbitan tristearate.

Characteristics of the waxes preferably used in the present invention are now described.

Natural waxes are broadly divided into those of plant origin, those of animal origin, and those of mineral origin. Synthetic waxes are broadly divided into coal-derived synthetic waxes, petroleum-derived polyethylene-based waxes, and fat- and oil-derived synthetic waxes (ester-based, amide-based, and glyceride-based). Furthermore, the petroleum waxes are broadly divided into paraffin waxes (normal chain), micro waxes (branched chain, solid at normal temperature), and petrolactums (branched chain, semisolid at normal temperature).

From the many types of waxes, the present inventors have chosen a normal paraffin belonging to the petroleum-derived waxes, and have found that using this in combination with an ester-based fat- and oil-derived synthetic wax enables the napping treatment to be carried out efficiently, particularly for polyester fabrics, while reducing the coefficient of friction between the fibers.

With regard to the normal paraffin, commercial products are available as the paraffin wax types manufactured by Nippon Seiro Co., Ltd. For example, it is preferable to use those having 23 to 33 carbons on average and a melting point of 50 to 60° C.

The ratio of the ester-based wax to the normal paraffin is preferably 1.5:1 to 2.5:1, and more preferably about 2:1.

The above-mentioned napping oil is preferably used in the form of an emulsion made using a nonionic surfactant and an anionic surfactant.

With regard to the nonionic surfactant, a polyoxyethylene alkyl ether is preferred.

With regard to the anionic surfactant, a sodium alkanesulfonate having 12 to 15 carbons is preferred.

Specific examples of the nonionic surfactant and the anionic surfactant are illustrated below, but they are not limited thereto ($—C_6H_4—$ denotes a phenylene group).

1: $C_{16}H_{33}(OCH_2CH_2)_{10}OH$
2: $C_9H_{19}—C_6H_4—(OCH_2CH_2)_{12}OH$
3: Sodium dodecylbenzenesulfonate
4: Sodium tri(isopropyl)naphthalenesulfonate
5: Sodium tri(isobutyl)naphthalenesulfonate
6: Sodium dodecylsulfate
7: Sodium di(2-ethylhexyl) α-sulfosuccinate
8: $C_8H_{17}—C_6H_4—(CH_2CH_2O)_3(CH_2)_2SO_3K$ The ratio of the nonionic surfactant to the anionic surfactant is preferably 1.5:1 to 1:1.5, and more preferably about 1:1.

The proportion of the surfactants relative to the napping oil is 30 to 50 parts by weight relative to 100 parts by weight of the napping oil, and more preferably about 40 parts by weight.

A preferable embodiment of the napping oil application step is now explained.

The application step is preferably carried out using a heat tenter at a temperature of 100° C. to 150° C. and a cloth speed of 10 to 30 m/min with a mangle load of 2 to 10 kg/cm$^2$ and a mangle constriction ratio of 40% to 80%.

It is preferable to carrying out napping within 7 days after immersion in the napping oil. More preferably, napping is carried out within 1 to 6 days.

In accordance with the present invention, it is possible to provide a photographic film cartridge comprising a light-shielding cloth having excellent light-shielding properties and drawing-out torque.

Furthermore, it is also possible to provide a light-shielding cloth for a photographic film cartridge, the light-shielding cloth comprising a napped light-shielding member formed from inexpensive warp and weft, the light-shielding member allowing a target napped cloth thickness to be achieved while maintaining stable light-shielding performance and film drawing-out performance.

EXAMPLES

Examples of the preparation of the light-shielding cloth are illustrated below, but the present invention is not limited thereby.

Examples 1 to 3 and Comparative Examples 1 and 2

Preparation of Light-shielding Cloth

The warp used was a thread formed by processing a 75 denier 36 filament 100% polyester fiber filament thread by a single step heater method and having 300 twists/m and interlacing (air-entanglement) of 200 times/m.

The weft used was a 100% polyester fiber 20 count two-ply spun thread equivalent to 1.4 denier, strongly twisted so as to have 300 twists/m.

The loom used was an air jet loom giving a warp density of 134 threads/inch, a weft density of 68 threads/inch, and a 5 shaft filling face satin weave structure.

The dyeing machine used was a circular jet dyeing machine, and the dye used was a disperse dye giving a dyeing density of 7% o.w.f.

The napping oil used was a mixture containing 10 wt % of sorbitan distearate (ester-based wax), 5 wt % of normal paraffin (petroleum wax), 3 wt % of polyoxyethylene alkyl ether (nonionic surfactant), and 3 wt % of sodium alkanesulfonate (anionic surfactant), the concentration of the napping oil being 2.0 wt %.

The number of napping treatments was as shown in Table 3. For example, for a total number of napping treatments of six in Table 3, the details were as follows.

That is, the coarse napping treatment with a high rotational torque of the napper rollers was carried out twice so as to nap bundles of one ply of the two-ply weft, and the fine napping treatment with a comparatively low torque was carried out four times so as to fiberize the bundles. By adjusting the napping conditions for the total of six napping treatments, a target thickness of 1.55 mm after the napping treatments was achieved. A subsequent shearing step was omitted, and the nap formed from the weft remained looped.

After coating the napped light-shielding cloth with an antistatic agent and a sealant, the cloth was attached to a film outlet of a 135 film cartridge by means of an adhesive.

With regard to the antistatic agent, a cationic antistatic agent (Eletat AK-10 (product name, guanidine hydrochloride type special cationic polymer), manufactured by Ipposha Oil Industries Co., Ltd.) was used at a concentration of 0.4 wt %.

With regard to the sealant, an emulsion type styrene—acrylic resin (viscosity: 1500 mPa·s) was used, and it was coated by a reverse knife coater method. The amount of sealant coated was 45 g/m$^2$.

With regard to the adhesive, an emulsion type styrene—acrylic resin (viscosity: 1300 mPa·s) was used, and it was coated by means of a rod coater. The amount of adhesive coated was 75 g/m$^2$, and the target value for the thickness of the light-shielding cloth after coating was 1.6 mm.

After coating the light-shielding cloth with the sealant it was slit into widths of 11.5 mm and 9.5 mm by means of an ultrasonic slitter. The same width of the light-shielding cloth can be used for upper and lower parts of the film outlet. After slitting, the light-shielding cloth was traverse wound around a plastic reel. Subsequently, two of the long lengths of teremp were continuously bonded to left and right edges respectively of a plurality of cartridge shell sheet pieces by employing conveying means that continuously conveyed the plurality of sheet pieces in a state in which they are arranged so that the forward end and the rear end of adjacent pieces were in proximity to each other, that is, with the left edges being in line with each other and the right edges being in line with each other, and pressing means that pressed the teremps precoated with the adhesive onto the left and the right edges respectively of the sheet pieces that were being conveyed. The long lengths of teremps thus attached were then cut from their reverse sides for each of the thin sheet pieces to give cartridge shell sheets. An ISO 400 color negative film (FUJI COLOR SUPERIA 400 (product name), manufactured by Fuji Photo Film Co., Ltd.) was wound around a spool and housed within a cartridge formed from the cartridge shell sheet above, and qualities such as the light-shielding properties and the drawing-out torque were evaluated. The results are given in Table 3.

In order to achieve a thickness of 1.65 mm in a 135 type cartridge when the teremps are attached to the cartridge shell sheet, which achieves both light-shielding and film drawing-out performance and satisfies restrictions on the port dimensions, it is preferable for the thickness after napping to be 1.55 mm. This target value of 1.55 mm is set by taking into consideration the finishing step after napping, the sealant and adhesive application step, and the step involving attachment to the cartridge shell sheet.

TABLE 1

| Number of napping treatment | Napping conditions: set values | | Process control values | | |
|---|---|---|---|---|---|
| | Torque (front drum) counter/pile (rpm) | Torque (rear drum) counter/pile (rpm) | Thickness: mm (3 point average) | Width: cm | Warp density: threads/inch (3 point average) |
| 1st (single stage) | 1300–1380/ 900–940 | — | 1.10 ± 0.2 | 142.5 ± 7.5 | 108 ± 5 |
| 2nd (single stage) | 1300–1380/ 900–940 | — | 1.30 ± 0.2 | 131.5 ± 6.5 | 117 ± 5 |
| 3rd (two-stage) | 1155/980 (fixed) | 1155/980 (fixed) | 1.12–1.45 | 120–135 | 113–128 |
| 4th (two-stage) | 1155/980 (fixed) | 1155/980 (fixed) | 1.25–1.50 | 115–130 | 119–133 |
| 5th (two-stage) | 1120–1190/ 945–1015 | 1120–1190/ 945–1015 | 1.49 ± 0.08 | 116 ± 5 | 132 ± 5 |
| 6th (two-stage) | 1120–1190/ 920–1040 | 1120–1190/ 910–1050 | 1.55 ± 0.05 | 111 ± 5 | 137 ± 5 |

The process control values of the 3rd and 4th napping treatments were target values, and the others were controlled values.

'Counter' referred to above means a napper roller that rotates in the direction opposite to that in which the napped cloth advances, and the values in the table are expressed as the rotational speed (rpm).

'Pile' referred to above means a napper roller that rotates in the direction in which the napped cloth advances, and the values in the table are expressed as the rotational speed (rpm).

TABLE 2

| Items controlled | Controlled values | Measurement method |
|---|---|---|
| Width | 114 ± 4 cm | Measure |
| Warp density | 134 ± 5 threads/inch | Lunometer (densimeter) |
| Thickness | 1.55 ± 0.05 mm (variation of average of 3 points in width direction) 1.55 ± 0.15 mm (variation of 1 point measurement) | Model G φ 30 PEACOCK dial gauge |

TABLE 3

| | Comp Ex. 1 | Ex. 1 | Ex. 2 | Ex. 3 | Comp Ex. 2 |
|---|---|---|---|---|---|
| Change in thickness when carrying out coarse napping | | | | | |
| Single stage 1st time | +0.20 | +0.20 | +0.20 | +0.20 | +0.20 |
| Single stage 2nd time | — | — | +0.20 | +0.20 | +0.20 |
| Change in thickness when carrying out fine napping | | | | | |
| Two-stage 1st time | −0.15 | −0.15 | −0.15 | −0.15 | — |
| Two-stage 2nd time | — | +0.18 | +0.18 | +0.18 | — |

TABLE 3-continued

| | Comp Ex. 1 | Ex. 1 | Ex. 2 | Ex. 3 | Comp Ex. 2 |
|---|---|---|---|---|---|
| Two-stage 3rd time | — | — | — | +0.15 | — |
| Two-stage 4th time | — | — | — | +0.10 | — |
| Thickness of cloth (mm) | | | | | |
| Before napping | 1.50 | 1.32 | 1.12 | 0.87 | 1.15 |
| After napping | 1.55 | 1.55 | 1.55 | 1.55 | 1.55 |
| Light-shielding properties of cartridge | B | A | A | A | C |
| Film drawing-out torque | C | B | A | A | A |

Evaluation Method

Thickness

Measured using a model Gφ30 PEACOCK dial gauge manufactured by Ozaki Mfg. Co., Ltd.

Light-shielding Properties

After storing a sample at 50° C. dry for 24 hours, 90,000 Lux light was applied from three directions, that is, from the direction of the port outlet and from the two sides for 5 minutes each, that is, a total of 15 minutes. The film was developed, and the extent of light fogging was evaluated as follows.

A: Fogging was only observed within 15 cm from the port outlet.
B: Fogging was only observed within 15 cm from the port outlet, but the fogging was only just within specification.
C: Fogging was observed beyond 15 cm from the port outlet.

Drawing-out Torque

After storing a sample at 50° C. dry for 24 hours, the film drawing-out torque was measured using an Instron tensile tester and evaluated as follows.
A: Within specification.
B: Only just within specification.
C: Outside specification.

The results shown in Table 3 demonstrate that when the number of napping treatments is small, since the nap thickness does not increase, the film drawing-out resistance increases, and when no fine napping treatment is carried out, the light-shielding properties of the cartridge deteriorate.

Examples 4 to 7

A cloth was subjected to napping treatments in the same manner as in Example 3 except that a napping oil shown in Table 4 was used.

Evaluation Method

Napping Properties

A: A thickness of 1.45 mm or above was achieved by means of a standard napping torque of a napping machine.
B: A thickness of 1.40 mm or above was achieved by means of a napping torque within an adjustment range.

Image Quality

A: No imprints of pile threads when 10 films (36 exposures) were exposed, developed and printed.
B: One film with imprint of pile threads.

Light-shielding Properties

After conditioning a sample at room temperature for 24 hours, 90,000 Lux light was applied from three directions, that is, from the direction of the port outlet and from the two sides for 5 minutes each, that is, a total of 15 minutes. The film was developed, and the extent of light fogging was evaluated as follows.
A: Fogging was only observed within 15 cm from the port outlet.
B: Fogging was only observed within 15 cm from the port outlet, but the fogging was only just within specification.

Drawing-out Torque

After conditioning a sample at room temperature for 24 hours, the drawing-out force was measured using an Instron tensile tester (Strograph V1-C, manufactured by Toyo Seiki Co., Ltd.). 'Instron' is the name of the company that has developed this type of tester, and it is also called a Strograph or a Tensilon. The leading edge of a film was clamped by means of a chuck, and the film was drawn at a drawing-out speed/chart speed of 500 mm/min, and the peak value in the chart was read off.

A: Within specification.
B: Outside specification.

TABLE 4

| Examples | 4 | 5 | 6 | 7 |
|---|---|---|---|---|
| Type of napping oil* | | | | |
| Between fibers | Sorbitan distearate 10 wt % | Sorbitan distearate 10 wt % | Sorbitan distearate 5 wt % | Sorbitan distearate 15 wt % |
| Fiber · metal | Normal paraffin 5 wt % | Normal paraffin 5 wt % | Normal paraffin 2 wt % | Normal paraffin 10 wt % |
| Time passed | 1 day | 7 days | 1 day | 1 day |
| Napping properties | A | A | A | A |
| Photographic properties | A | A | A | A |
| Light-shielding properties | A | B | B | A |
| Drawing-out torque | A | A | A | A |
| *Note | | | | |
| Between fibers/fiber · metal | Ester-based wax/normal paraffin | Same as on left | Same as on left Minimum concentration | Same as on left Maximum concentration |

What is claimed is:

1. A photographic film cartridge comprising:
   a light-shielding cloth that is attached to a photographic film cartridge outlet slit through which a film is drawn out;
   the light-shielding cloth being a cloth that is subjected to napping;
   the napping comprising napping with a coarse napping machine and then napping with a fine napping machine, the napping machines having napper rollers comprising a pile roller that rotates in the direction in which the cloth advances and a counter roller that rotates in the direction opposite to the direction in which the cloth advances, the rotational speed of the pile roller of the fine napping machine being higher than the rotational speed of the pile roller of the coarse napping machine and the rotational speed of the counter roll of the coarse napping machine being higher than the rotational speed of the counter roller of the fine napping machine;
   the napping being carried out so that the cloth thickness obtained by napping using the fine napping machine is less than the cloth thickness obtained by napping using the coarse napping machine; and
   a further napping being carried out using the fine napping machine so that the cloth thickness is greater than the cloth thickness obtained by napping using the coarse napping machine.

2. The photographic film cartridge according to claim 1 wherein the treatment using the coarse napping machine is carried out twice using a singe stage napping machine or once using a two-stage napping machine.

3. The photographic film cartridge according to claim 2 wherein the treatment using the fine napping machine is carried out at least twice using a two-stage napping machine.

4. The photographic film cartridge according to claim 3 wherein each stage of the two-stage napping machine has a total of 24 napper rollers comprising 12 counter rollers and 12 pile rollers.

5. The photographic film cartridge according to claim 2 wherein the single stage napping machine has a total of 36 napper rollers comprising 18 counter rollers and 18 pile rollers.

6. The photographic film cartridge according to claim 1 wherein the light-shielding cloth that is attached to the photographic film cartridge outlet slit through which the film is drawn out comprises a cloth that is formed by immersing the cloth in a napping oil containing an ester-based wax and normal paraffin, then drying, and napping using a napping machine having a napper roller.

7. The photographic film cartridge according to claim 6 wherein the napping oil is an emulsion formed using a nonionic surfactant and an anionic surfactant.

8. The photographic film cartridge according to claim 7 wherein the cloth is napped within 7 days after immersing in the napping oil.

9. The photographic film cartridge according to claim 7 wherein the ratio of the nonionic surfactant to the anionic surfactant used is 1.5:1 to 1:1.5.

10. The photographic film cartridge according to claim 7 wherein the total amount of the nonionic surfactant and the anionic surfactant used is 30 parts by weight to 50 parts by weight relative to 100 parts by weight of the napping oil.

11. The photographic film cartridge according to claim 7 wherein the nonionic surfactant is a polyoxylene alkyl ether and the anionic surfactant is a sodium alkanesulfonate.

12. The photographic film cartridge according to claim 6 wherein the thickness of the napped base cloth is 0.5 to 2.5 mm.

13. The photographic film cartridge according to claim 6 wherein the base cloth is a 3 to 5 shaft filling face satin weave cloth.

14. The photographic film cartridge according to claim 6 wherein the ester-based wax is a sorbitan fatty acid ester.

15. The photographic film cartridge according to claim 6 wherein the ratio of the ester-based wax to the normal paraffin used is 1.5:1 to 2.5:1.

16. The photographic film cartridge according to claim 6 wherein the ester-based wax is sorbitan distearate.

17. The photographic film cartridge according to claim 1 wherein the thickness of the napped base cloth is 0.5 to 2.5 mm.

18. The photographic film cartridge according to claim 1 wherein the base cloth is a 3 to 5 shaft filling face satin weave cloth.

* * * * *